Figure 6:
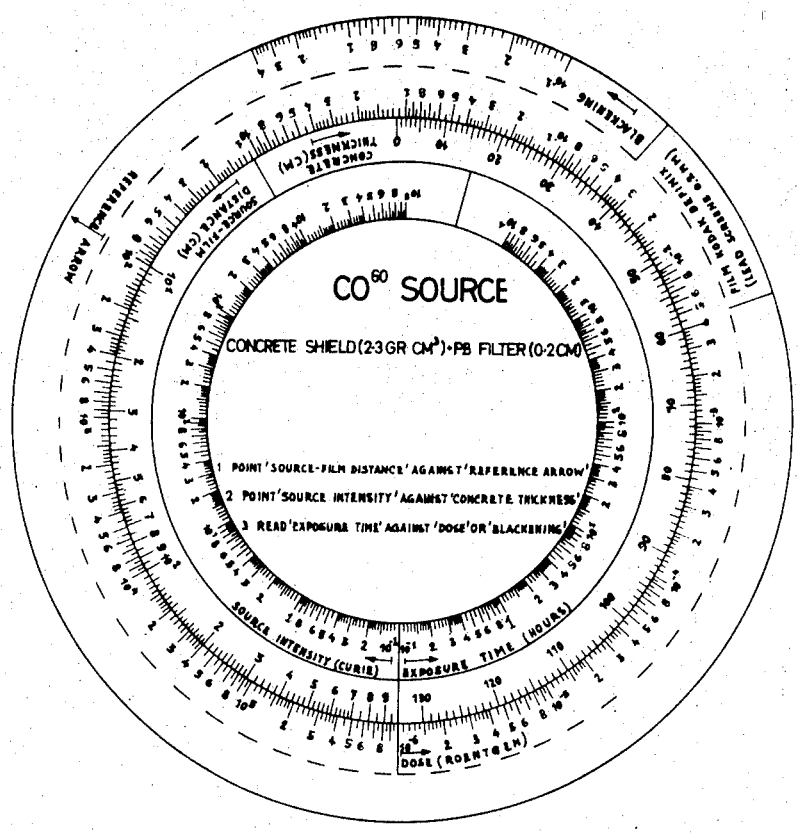

United States Patent
Gaggero et al.

[15] 3,700,162
[45] Oct. 24, 1972

[54] CIRCULAR CALCULATOR FOR THE SOLUTION OF PROBLEMS CONNECTED WITH ELECTROMAGNETIC RADIATION PENETRATION

[72] Inventors: Giancarlo Gaggero, Besozzo; Carla Mongini-Tamagnini, Angera, both of Italy; Antoine Settipani, Bagneux, France

[73] Assignee: European Atomic Energy Community (Euratom), Kirchberg, Luxembourg

[22] Filed: Oct. 27, 1969

[21] Appl. No.: 869,752

[30] Foreign Application Priority Data

Nov. 8, 1968    Great Britain..........53,097/68

[52] U.S. Cl. .................................................235/78
[51] Int. Cl. ............................................G06c 27/00
[58] Field of Search..........235/88, 84, 70, 70.1, 64.7, 235/78

[56] References Cited

UNITED STATES PATENTS

| | | | |
|---|---|---|---|
| 1,609,972 | 12/1926 | Sherrer | 235/70 |
| 2,411,491 | 11/1946 | Williams | 235/64.7 |
| 2,484,366 | 10/1949 | Wilson | 235/88 |

FOREIGN PATENTS OR APPLICATIONS

| | | | |
|---|---|---|---|
| 859,063 | 1/1961 | Great Britain | 235/88 |
| 901,502 | 7/1962 | Great Britain | 235/70 A |

OTHER PUBLICATIONS

"X-Rays in Practice," Wayne T. Sproull, 1946, McGraw-Hill, p. 280.

*Primary Examiner*—Richard B. Wilkinson
*Assistant Examiner*—Stanley A. Wal
*Attorney*—Stevens, Davis, Miller & Mosher

[57] ABSTRACT

A circular calculator for the solution of radiation penetration problems, the parameters of which are: source indensity $I$, exposure time $T$, thickness $L$ of a shield, source-target distance $K$ and one of the radiation dose $R$ at the target position and a quantity related to the radiation effect $X$ on the target, comprising three concentric disks of different radii movable relatively to one another around an axis, two of which disks have each of two scales in opposition associated with the first four parameters $I$, $T$, $L$, $K$, the third disk having a scale associated with one of the two remaining parameters $R$ and $X$ and carrying an indicator of the $R$ scale.

3 Claims, 7 Drawing Figures

```
C     MAIN PROGRAM
      DIMENSION PAGL(60),PAGI(60),PAGK(60),PAGR(60),PALL(150),
     1ENERGB(60),ENERGM(60),AL(60),S(10),AMU(60),AMUF(60,10),
     1B(100,150),SORG(100),YIELD(100),A(100),AMUN(100),AMUFN(100,10),
     1BN(100,60),VETT(100),FF(150)
C
      READ (5,3) NTRAKT,NTRAKI,NTRAKK,NTRAKR,NLL
      READ (5,2) (PAGT(I),I=1,NTRAKT)
      READ (5,4) (PAGI(I),I=1,NTRAKI)
      READ (5,2) (PAGR(I),I=1,NTRAKR)
      READ (5,2) (PAGK(I),I=1,NTRAKK)
      READ (5,4) (PALL(I),I=1,NLL)
C
CCCCC NTRAKT,NTRAKI,NTRAKK,NTRAKR   REPRESENT THE NUMBER OF TRACKS
CCCCC WANTED ON A TYPICAL INTERVAL  10**(I)--10**(I+1) OF A LOGARITHMIC
CCCCC SCALE FOR THE PARAMETERS T,I,K,R
CCCCC THE VALUES ON THE TRACKS WILL BE  PAG*10**(I).
CCCCC NLL REPRESENTS THE NUMBER OF TRACKS FOR THE L SCALE CORESPONDING
CCCCC TO THE VALUES PALL
      WRITE (6,301)
      CALL ANGLE(NTRAKT,PAGT)
      WRITE (6,302)
      CALL ANGLE(NTRAKI,PAGI)
      WRITE (6,304)
      CALL ANGLE2(NTRAKK,PAGK)
      READ(5,3)NSM,NSX
C
CCCCC NSN=NUMBER OF SCALES TO BE TRACED FOR L PARAMETER
CCCCC NSX=NUMBER OF SCALES TO BE TRACED FOR X PARAMETER
C
      ICONTM=1
  100 CONTINUE
      READ (5,3) NEB,NEM,NF,NES,NL
      READ (5,4) (ENERGB(I),I=1,NEB)
      READ (5,4) (ENERGM(I),I=1,NEM)
      READ (5,4) (AL(I),I=1,NL)
      READ (5,4) (S(I),I=1,NF)
      READ (5,4) (AMU(I),I=1,NEM)
      DO 5 K=1,NF
    5 READ (5,4) (AMUF(I,K),I=1,NEM)
      DO 6 I=1,NEB
    6 READ (5,4) (B(I,K),K=1,NL)
      READ (5,4) EFFE,ATTMIN,TEMMIN,DISMAX,ALMAX
      READ (5,4) (SORG(I),I=1,NES)
      READ (5,4) (YIELD(I),I=1,NES)
C
CCCCCCC NEB   = NUMBER OF ENERGY POINTS IN B SET
CCCCCCC NEM   = NUMBER OF ENERGY POINTS IN MU SETS
CCCCCCC NL    = NUMBER OF SHIELD THICKNESS POINTS IN B SET
CCCCCCC NF    = NUMBER OF FILTERS
CCCCCCC NES   = NUMBER OF ENERGY POINTS IN SOURCE SPECTRUM
CCCCCCC ENERGB = ENERGY VALUES IN B SET
CCCCCCC ENERGM = ENERGY VALUES IN MU SETS
CCCCCCC AL    = SHIELD THICKNESS VALUES IN B SET
CCCCCCC S     = FILTER THICKNESS
CCCCCCC AMU   = MU VALUES FOR SHIELD
CCCCCCC AMUF  = MU VALUES FOR THE FILTERS
CCCCCCC B     = DOSE BUILD-UP FACTORS
CCCCCCC EFFE  = NORMALIZATION FACTOR
CCCCCCC ATTMIN = MINIMUM SOURCE INTENSITY
CCCCCCC TEMMIN = MINIMUM EXPOSURE TIME
CCCCCCC DISMAX = MAXIMUM SOURCE-TARGET DISTANCE
CCCCCCC ALMAX  = MAXIMUM SHIELD THICKNESS
```

```
C     SORG   = ENERGY VALUES FOR THE SOURCE SPECTRUM
C     YIELD  = SOURCE SPECTRUM YIELDS ASSOCIATED WITH ENERGY VALUES
C
      DO 8 JJ=1,NES
      EX=SORG(JJ)
    8 AMUN(JJ)=PARAB(ENERGM,AMU,EX,NEM)
      DO 7 KF=1,NF
      DO 9 JJ=1,NEM
    9 VETT(JJ)=AMUF(JJ,KF)
      DO 7 JJ=1,NES
      EX=SORG(JJ)
    7 AMUFN(JJ,KF)=PARAB(ENERGM,VETT,EX,NEM)
      DO 10 KK=1,NEB
      DO 11 JJ=1,NEB
   11 VETT(JJ)=B(JJ,KK)
      DO 10 JJ=1,NES
      EX=SORG(JJ)
   10 BN(JJ,KK)=PARAB(ENERGB,VETT,EX,NEB)
      DO 23 J1=1,NES
      DO 24 KK=1,NL
   24 VETT(KK)=BN(J1,KK)
      DO 23 JJ=1,NLL
      EX=PALL(JJ)
   23 B(J1,JJ)=PARAB(AL,VETT,EX,NL)
      DO 12 KK=1,NLL
      FF(KK)=0.
      DO 13 JJ=1,NES
      ACCUM=0.
      DO 14 II=1,NF
   14 ACCUM=ACCUM+AMUFN(JJ,II)*S(II)
   13 FF(KK)=FF(KK)+YIELD(JJ)*B (JJ,KK)*EXP(-AMUN(JJ)*PALL(KK))*EXP(-ACC
     *UM)
   12 FF(KK)=FF(KK)*EFFE
      TEMP=(ATTMIN*TEMMIN*FF(NLL))/(DISMAX**2)
      DO 1000 JK=1,NL
 1000 FF(JK) = ALOG10(FF(JK)/FF(NLL))
      WRITE (6,305) ICONTM
      CALL THICK(NLL,FF)
      WRITE (6,300) TEMP
      IF(ICONTM.GE.NSM)GO TO 101
      ICONTM=ICONTM+1
      GO TO 100
  101 ICONTX=1
      WRITE (6,303)
      CALL ANGLE(NTRAKR,PAGR)
      IF(NSX.EQ.0) GO TO 201
  200 CONTINUE
      READ (5,3)NBL
      READ (5,4) (A(I),I=1,NBL)
C
C     NBL = NUMBER OF POINTS IN WHICH THE FUNCTION X=G(R) IS GIVEN
C           I.E. NUMBER OF TRACKS ON THE X SCALE
C     A   = VALUES OF R PARAMETER IN THE NBL POINTS
C
      WRITE (6,306) ICONTX
      CALL XPAR (NBL,A)
      IF(ICONTX.GE.NSX)GO TO 201
      ICONTX=ICONTX+1
      GO TO 200
  201 CONTINUE
      STOP
C
    3 FORMAT (1216)
    4 FORMAT (6E12.4)
```

FIG. 2.

```
300 FORMAT (38HOPOSITION  OF THE ARROW ON THE R SCALE,E15.3)
301 FORMAT (1H1,3X,'EXPOSURE TIME SCALE ANGLES'//)
302 FORMAT (1H1,3X,'SOURCE INTENSITY SCALE ANGLES'//)
303 FORMAT (1H1,3X,'EXPOSURE DOSE SCALE ANGLES'//)
304 FORMAT (1H1,3X,'SOURCE-TARGET DISTANCE SCALE ANGLES'//)
305 FORMAT (1H1,3X,'SHIELD THICKNESS SCALE ANGLES (SCALE NO.',I2,')'//)
306 FORMAT (1H1,3X,'FUNCTION X=G(R) SCALE ANGLES (SCALE NO.',I2,')'//)
    END
C
C ******************************************
    SUBROUTINE ANGLE(NAA,V1)
    DIMENSION V1(100),V2(100),L1(100),L2(100),L3(100)
    DO 7 K=1,NAA
  7 V2(K)=ALOG10(V1(K))
    DO 8 K=1,NAA
  8 V2(K)=V2(K)*30.
    DO 9 K=1,NAA
    L1(K)=V2(K)
    V2(K)=V2(K)-L1(K)
    V2(K)=V2(K)*60.
    L2(K)=V2(K)
    V2(K)=V2(K)-L2(K)
    V2(K)=V2(K)*60.
  9 L3(K)=V2(K)
    DO 21 K=1,NAA
    A=FLOAT(L1(K))
    B=FLOAT(L2(K))
    C=FLOAT(L3(K))
 21 PUNCH 20,A,B,C
    WRITE (6,10) (L1(K),L2(K),L3(K),K=1,NAA)
    DO 11 M=1,11
    DO 12 K=1,NAA
 12 L1(K)=L1(K)+30
    DO 22 K=1,NAA
    A=FLOAT(L1(K))
    B=FLOAT(L2(K))
    C=FLOAT(L3(K))
 22 PUNCH 20,A,B,C
 11 WRITE (6,10) (L1(K),L2(K),L3(K),K=1,NAA)
    RETURN
 10 FORMAT (8X,I5,I6,1H',I5,2H'')
 20 FORMAT(1X,F5.0,2F6.0)
    END
C
C ******************************************
    SUBROUTINE ANGLE2(NAA,W1)
    DIMENSION W1(100),W2(100),LL1(100),LL2(100),LL3(100)
    DO 7 K=1,NAA
  7 W2(K)=ALOG10(W1(K))
    DO 8 K=1,NAA
  8 W2(K)=W2(K)*60.
    DO 9 K=1,NAA
    LL1(K)=W2(K)
    W2(K)=W2(K)-LL1(K)
    W2(K)=W2(K)*60.
    LL2(K)=W2(K)
    W2(K)=W2(K)-LL2(K)
    W2(K)=W2(K)*60.
  9 LL3(K)=W2(K)
    DO 31 K=1,NAA
    A=FLOAT(LL1(K))
```

FIG.3.

```
        B=FLOAT(LL2(K))
        C=FLOAT(LL3(K))
 31     PUNCH 30,A,B,C
        WRITE (6,11) (LL1(K),LL2(K),LL3(K),K=1,NAA)
        DO 18 MA0=1,5
        DO 12 K=1,NAA
 12     LL1(K)=LL1(K)&60
        DO 32 K=1,NAA
        A=FLOAT(LL1(K))
        B=FLOAT(LL2(K))
        C=FLOAT(LL3(K))
 32     PUNCH 30,A,B,C
        WRITE (6,11) (LL1(K),LL2(K),LL3(K),K=1,NAA)
 18     CONTINUE
        RETURN
 11     FORMAT (8X,I5,I6,1H',I5,2H'')
 30     FORMAT(1X,F5.0,2F6.0)
        END
C
C       * * * * * * * * * * * * * * * * * * * * * * * * * *

SUBROUTINE THICK(NL,F)
        DIMENSION F(150),A(150),L1(150),L2(150),L3(150)
        DO 5 K=1,NL
        A(K)=F(K)*30.
        IF(K.EQ.1) AA=A(1)
        A(K)=AA-A(K)
        L1(K)=A(K)
        A(K)=A(K)-L1(K)
        A(K)=A(K)*60.
        L2(K)=A(K)
        A(K)=A(K)-L2(K)
        A(K)=A(K)*60.
 5      L3(K)=A(K)
        DO 1000 K=1,NL
        AHA=FLOAT(L1(K))
        B=FLOAT(L2(K))
        C=FLOAT(L3(K))
        PUNCH 30,AHA,B,C
        WRITE (6,6) L1(K),L2(K),L3(K)
 1000   CONTINUE
        RETURN
 6      FORMAT (8X,I5,I6,1H',I5,2H'')
 30     FORMAT (1X,F5.0,2F6.0)
        END
C
C       * * * * * * * * * * * * * * * * * * * * * * * * * *

SUBROUTINE XPAR(NBL,V1)
        DIMENSION V1(100),V2(100),L1(100),L2(100),L3(100)
        DO 13 K=1,NBL
        DO 11 INDIC=1,100
        TPAR=10.E-06*(10.**INDIC)
        IF(V1(K).LT.TPAR)GO TO 12
 11     CONTINUE
 12     NUMERO=INDIC-1
        V1(K)=V1(K)*10.**(6-NUMERO)
        V2(K)=ALOG10(V1(K))*30.
        L1(K)=V2(K)
        V2(K)=(V2(K)-L1(K))*60.
        L2(K)=V2(K)
        V2(K)=(V2(K)-L2(K))*60.
        L3(K)=V2(K)
        L1(K)=L1(K)+(NUMERO*30)
```

FIG.4.

```
   13 CONTINUE
      DO 31 K=1,NBL
      A=FLOAT(L1(K))
      B=FLOAT(L2(K))
      C=FLOAT(L3(K))
   31 PUNCH 30,A,B,C
      WRITE (6,18) (L1(K),L2(K),L3(K),K=1,NBL)
      RETURN
   18 FORMAT (8X,I5,I6,1H',I5,2H'')
   30 FORMAT (1X,F5.0,2F6.0)
      END
C
C * * * * * * * * * * * * * * * * * * * * * * * * * * * *
C
      FUNCTION PARAB(EPS,QRZ,ARG,NN)
      DIMENSION EPS(NN),QRZ(NN)
      IF(ARG-EPS(NN))206,726,230
  206 IF(ARG.GT.EPS(NN-1))GO TO 230
      IF(ARG.GT.EPS(3))GO TO 217
      T1=EPS(1)
      T2=EPS(2)
      T3=EPS(3)
      FT1=QRZ(1)
      FT2=QRZ(2)
      FT3=QRZ(3)
      GO TO 600
  217 DO 222 I=4,NN
      IF(ARG-EPS(I))227,725,222
  222 CONTINUE
  227 EPT=(EPS(I-1)+EPS(I))*0.5
      IF(ARG.GT.EPT)GO TO 225
      T1=EPS(I-2)
      T2=EPS(I-1)
      T3=EPS(I)
      FT1=QRZ(I-2)
      FT2=QRZ(I-1)
      FT3=QRZ(I)
      GO TO 600
  225 T1=EPS(I-1)
      T2=EPS(I)
      T3=EPS(I+1)
      FT1=QRZ(I-1)
      FT2=QRZ(I)
      FT3=QRZ(I+1)
  600 AY=(FT2-FT1)/(T2-T1)
      BY=(FT3-FT2)/(T3-T2)
      C=T3-T1
      D=(BY-AY)/C
      E=ARG-T2
      G=(D*E)+AY
      PARAB=(ARG-T1)*G+FT1
      GO TO 2000
  726 I=NN
  725 PARAB=QRZ(I)
      GO TO 2000
  230 T1=EPS(NN-2)
      T2=EPS(NN-1)
      T3=EPS(NN)
      FT1=QRZ(NN-2)
      FT2=QRZ(NN-1)
      FT3=QRZ(NN)
      GO TO 600
 2000 RETURN
      END
```

FIG.5.

CIRCULAR CALCULATOR FOR THE SOLUTION OF PROBLEMS CONNECTED WITH ELECTROMAGNETIC RADIATION PENETRATION

In the problems connected with electromagnetic radiation penetration (e.g. gammagraphy, radiography, gammaprotection, radioprotection) one can frequently encounter a configuration of the following type: the radiation emitted by a point-source diffuses through a slab-geometry homogeneous shield of variable thickness (possibly preceded or followed by fixed thickness filters) and interacts with a target (e.g. film, tissue, detector).

This invention relates to a circular calculator which permits for the above described configuration, the rapid determination of anyone of the following five parameters as a function of the remaining four ones:

I. source intensity
T. exposure time
L. thickness of the shield
K. source-target distance
  (R, radiation dose at the target position or
Y = (
  (X, a quantity related to the radiation effect on the target
   (e.g. film-blackening, biological-damage)

The state of the art in the field of such calculators may be summarized by following documents:

British Pat. No. 859,063 — The calculator is confined to gamma-protection problems and consequently the dose parameter is replaced by the dose rate. Both in the "straight" and the circular forms the calculator consists of only two movable members since the parameters exposure time, $T$, and target response, $X$, are not considered. The know-how for the determination of the attenuation curves needed for the actual design of the calculator is not given in the patent specifications. French Pat. No. 1,224,823 and French Pat. of Addition 76.103 — The calculator is confined to gamma and radioprotection problems. The dose rate is correlated to the parameters $I,L,K,E$ (radiation source energy). It appears clearly that the practical utilization of the calculator is confined to monokinetic radiation sources. Besides the calculator being based on the representation of a family of curves the insertion on the same calculator of different materials appears impractical, unless by the use of approximate equivalent thickness correlations. Finally no procedure is given for the determination of the involved correlations, nor for the automatic design of the calculator.

U.S. Pat. No. 1,609,972 — The calculator is only directed to assist the surgeon in treatment of deseased tissues by means of radio-active materials, and to rapidly calculate the radiation intensity within the tissues.

The circular calculator according to the present invention is a calculator for the rapid solution of calculations associated with gammagraphy, radiography, gamma and radioprotection, for the determination of anyone of the five parameters, $I,T,K,L,Y$, ($Y=R$ or $X$), as a function of the remaining four, based on the Formulas (1) and (2), comprising three concentric discs of different radii movable relatively to one another around an axis, two of which discs have each two scales in opposition (i.e. with the positive directions in opposition) associated with the first four parameters $I,T,L,K$, the third disc has adjacent scales (with the same positive direction) associated with the remaining two parameters $R,X$, and carries on an indicator of the origin of the $R$ scale.

Said Formulas (1) and (2) are:

$$R(I,T,K,L) = I \cdot T \cdot K^{-2} \cdot F(L) \qquad 1.$$

$$X = G(R) \qquad 2.$$

where:

$F(L)$ (i.e. the dose for unit values of parameters $I,T,K$- depends on the energy spectrum of the radiation source, on the material composition of the shield and of the filters, and on the relative position of the filters in respect of the shield:

$G(R)$ depends on the response property of the target.

The function $G(R)$ is supposed known for each particular application. The function $F(L)$ may be directly determined experimentally or theoretically evaluated.

In accordance with the invention said theoretical evaluation of $F(L)$ is based on the correlation:

$$F(L) = f \cdot \int_0^\infty y(E) \cdot B(E, L) \cdot e^{-\mu(E) \cdot L} \cdot e^{-\Sigma j \mu j(E) \cdot sj} \, dE \qquad (3)$$

where:
$E$ = energy
$y(E)$ = radiation yield for the actual radiation source
$\mu(E)$ = absorption coefficient
$f$ = normalization factor
$B(E,L)$ = dose build-up factor for the actual configuration
$j$ = filters index
$s$ = filter thickness In the case of a source spectrum constituted by monocromatic lines, the integral in Equation (3) is replaced by a summation.

The above defined dose build-up factors, $B(E,L)$, are obtained by using high order double interpolation on a matrix $B^*$ ($E_n,L_m$), the elements of which are the results of exact theoretical calculations described in detail later on.

It appears clearly that for given geometrical configuration and material composition a same precalculated set $B^*$ ($E_n,L_m$) can be used to evaluate $F(L)$ for many different radiation sources (e.g. $Co^{60}$, $Ir^{192}$, X-ray spectra).

The theoretical determination of $F(L)$ according to the invention presents two major advantages with respect to the experimental one; (a) a higher reliability of results (this item will be discussed in more detail later on), (b) no need to repeat the whole calculations to treat different types of radiation sources for given configuration.

By translating Equation (1) into common logarithms, it is found:

$$\text{Log } R = \text{Log } I + \text{Log } T - 2 \text{ Log } K + \text{Log } F(L) \qquad 4.$$

It appears evident that the parameters, $R,I,T,K,L$ can be arranged in the form of a calculator.

Figure 7:
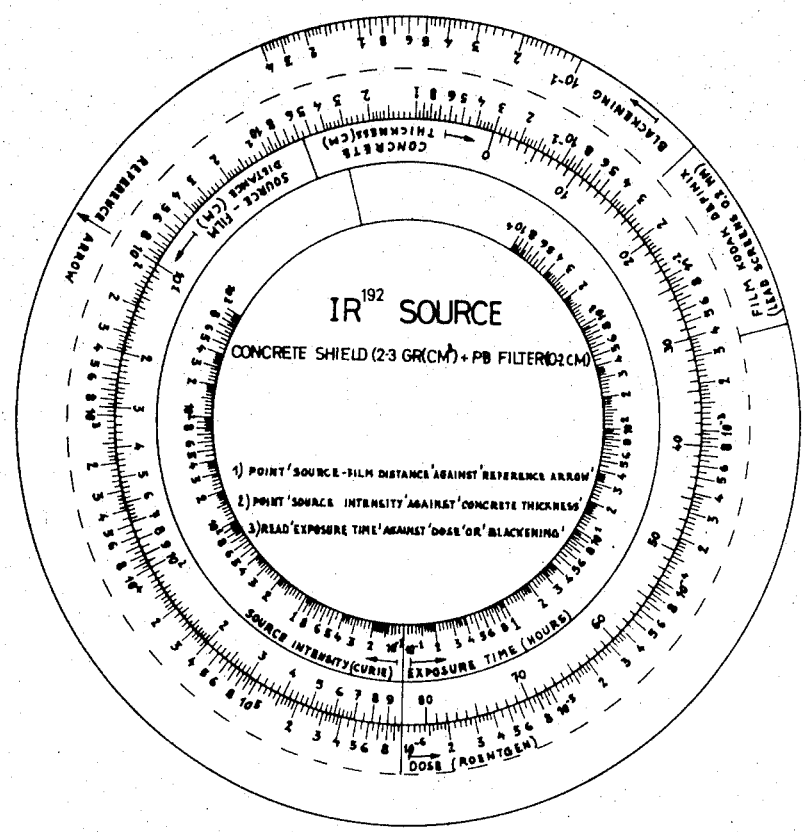

Other features of the invention will become apparent from the following description when read in light of the drawings of which:

FIGS. 1–5 illustrates the program employed in the design of the invention;

FIGS. 6 and 7 and views of the invention for two different radiation sources.

As concerns the automatic design of the calculator, according to the invention, a FORTRAN computer program has been developed, as shown in FIGS. 1–5, which starting from precomputed values of build-up factors, absorption coefficients, source spectrum, thickness of filters, normalization factor, ranges of the variables $I,T,K,L$ function $G(R)$, and scale specifications, evaluated $F(L)$ according to Formula (3) and gives in output the actual angles of the different scales according to Formulas (4) and (2).

As for the scale relative to the variable $L$, its form depends on the type of source and on the material composition, and according to the invention a whatever number of $L$ scales can be constructed and inserted into the calculator. Similarly a whatever number of $X$ scales can be inserted in the calculator.

The described automatic procedure is part of the invention and a listing of the program is given in FIGS. 1–5.

The actual construction of the calculator can be done on the basis of drawings completely executed by means of a FORTRAN program as, for example, "ACCESS—A PROGRAM FOR THE CALCOMP DATA PLOTTING OF CIRCULAR CALCULATORS," H.I. De Wolde, EURATOM Report Ex2965/A (Ref.I)

which utilizes the Calcomp-Data-Plotter. Input to the program are the angles previously calculated, the dimensions and the relative position of the various scales.

As concerning the higher reliability of the theoretical method in respect to the experimental one, a discussion follows.

The advanced computational techniques and the fast computers now available allow the theoretical determination of reliable does values. Besides the computational errors can be evaluated to a high precision. The advantages of the theoretical method become quite great in the case of considerable radiation diffusion (i.e. for high values of shield thickness), in which case the experimental determination of dose requires the use of detectors surrounded by lead to cut the wall scattered radiation. The presence of lead produces an enforcing effect which bias the measurements. In addition the experiments are somewhat influenced by the shape of the dosimeters. The adoption of theoretical models allow to the elimination of all the enforcing and the collimation effects.

As concerns the build-up factors calculations, one-dimensional models may be used (plane or spherical geometry); the results are then converted to the actual point-plane geometry by using well known formalisms.

To ascertain the reliability of calculated results a series of test problems has been set up by the inventors and three computer programs based on different theoretical methods apt to the solution of the radiation transport-equation were actually used. The results so obtained were in fairly good agreement over the explored range of the involved parameters.

A systematic source of error in the above calculation could derive from the choice of a cross-section library. In order to evaluate the effect of such an error on the calculated dose, some calculations have been performed twice adding and subtracting the known error to the absorption cross-section. The results are found to differ for less than 2 – 3 percent.

The programs considered are:

DTF-4, based on Carlson's $S_n$ method;
  "DTF-4, A FORTRAN-IV PROGRAM FOR SOLVING THE MULTIGROUP TRANSPORT EQUATION WITH ANISOTROPIC SCATTERING," K.D. Lathrop, Los Alamos — 1965 (Ref. II)

BIGGI-4, based on a direct numerical solution of the integral transport equation;
  "USER'S MANUAL FOR THE GAMMA TRANSPORT CODES BIGGI 3P AND BIGGI 4T," H. Penkuhn, EUR 3555 — 1967 (Ref. III)

SALOMON, based on Monte Carlo techniques.
  "ON THE TRANSFORMATION OF THE TRANSPORT EQUATION FOR SOLVING DEEP PENETRATION PROBLEMS BY THE MONTE CARLO METHOD," K. Leimdorfer, Transactions of Chalmers University Of Technology n. 286 — 1964 (Ref. IV)

All the above mentioned programs can not deal with radiation energies below the threshold under which fluorescence effects come into play (e.g. below 0.1 MeV for lead).

The application refers to the determination of exposure time in gammagraphy for non destructive controls of concrete buildings, (i.e. for the determination of the distribution of rods in reinforced concrete structure and for the detection of inhomogeneities in concrete works).

More in detail the gammagraphy technique can be schematized as follows. The gamma-rays produced by a point source diffuse through the concrete. At the rightmost side a film detects gamma-rays, through the effect of their secondary electrons. In fact, a charged particle (i.e. electron) passing through a grain of silver bromide in a photographic emulsion will generally cause changes which will result in the conversion of grain to atomic silver when the film is developed. Such developed grains cause a blackening of the emulsion.

One of the central problems connected to the gammagraphy practice is the accurate and quick determination of the exposure time required to obtain pictures of good quality, on the basis of irradiation conditions such as: (1) source type, (2) source intensity, (3) source-film distance, (4) shield thickness, (5) thickness and type of the filters, (6) type of the film and of the film-container, developing conditions, (7) film-blackening.

The need for a calculator for the determination of exposure time as a function of other parameters was felt since the beginning of gammagraphy practice.

In the references
"NOMOGRAMS FOR DETERMINING THE TIME OF IRRADIATION IN PENETRATING THROUGH CONCRETE BY MEANS OF THE RADIOACTIVE ISOTOPES $Co^{60}$, $Cs^{137}$, $Ir^{192}$," Honig, Leipzig (1960) pp. 40–41 (Ref. V)

"RADIOGRAFICZMA KONTROLA ZBROJENA W ZELBECIE" INZYNIERIA I BUDOWNICTOWO, L. Brunarski, No. 8–9 Warszawa Sierpen Wrzesien (1965) pp. 265–261 (Ref. VI)

"PAPERS ON RADIOGRAPHY," Kahn N.A., Inbembo E.A., Bland J. ,Spec. Tech. Pub. No. 96, A.S.T.M. (Ref. VII) nomograms or circular calculators for the solution of the problem are proposed, all based on experimental measurements. They differ from each other especially for the way to treat two of the discussed parameters; namely (a) the type of the film (including enforcing screens) and the developing conditions, (b) the source type. It must be noted that such parameters are not continuously varying parameters and hence they are somewhat difficult to handle.

As for the filter one can observe that its type and thickness are normally standard, being used just to "-cut" gamma rays below a certain energy threshold ($\approx 0.18$ MeV).

As far as the source type is concerned, the problem has been solved in the above mentioned literature by elimination of the parameter, i.e. by considering only nomograms or calculators for given source types. In particular in reference (V) nomograms are presented for $Co^{60}$, $Ir^{192}$, $Cs^{137}$ sources, while in references (VI) and (VII) $Co^{60}$ and Radium sources respectively are treated.

Concerning the film type (the developing conditions are considered standard), different choices are possible and consequently the problem to treat such information like a continuously varying parameter is very difficult.

In reference (V) the adopted solution is the elimination of the parameter, since each of the considered nomograms is valid just for a particular film-type. This fact can seriously prevent the use of the nomograms, whenever the film type is different from those there considered. Note that such a situation can frequently arise, the films treated in the nomograms being very special and difficult to find. A further limitation is represented by the fact that the film blackening does not appear in the nomograms as a parameter (a constant value in the range 1.5 – 1.75 is assumed.

As for the reference (VI) the author proposes a circular calculator in which the variation of film-type is taken into account in continuously varying form, by the introduction of the parameter "film-speed," being defined as the inverse of the exposure dose (in Roentgen) necessary to obtain a fixed blackening density, generally arount unit. It must be noted however that a one-to-one correspondence between film-type and film-speed exists only in the neighborhood of blackening equal unit. The calculator cannot then be used successfully whenever one is interested in blackening densities far from unit.

In the reference (VII) a circular calculator is presented originally developed for gammagraphy of steel, but containing correction factors to treat the case of materials other than steel. In this calculator too the film-speed is considered as representing the film-type.

We suggest the realization of a calculator being independent from the film-type, what can be done simply by introducing a new parameter, that is the "dose" (in Roentgen) at the entering surface of the film container.

The problem is now confined to correlate as previously described, for fixed source and film, the following parameters: (1) source intensity, (2) source-film distance, (3) shield thickness, (4) exposure time, (5) dose (Roentgen).

As for the dose-blackening correlation, it depends solely on the film type; in fact, whenever the gamma-ray energy is greater than about 0.18 MeV, spectral variations for a fixed dose do not influence the blackening, since the photoelectric interactions in silver do not come into play (see ref. VIII, IX).

"RADIATION DOSIMETRY," G.N. White, J. Wiley & Sons (Ref. VIII)

"PHOTOGRAPHIC DOSIMETRY OF X AND GAMMA-RAYS," M. Ehrlich, N.B.S. Handbook 57 (Ref. IX).

The experimental determination of the curve dose-blackening for a given film requires just a few experimental "points," each corresponding to the measure of the blackening for a given dose.

The introduction of the dose parameter according to the invention allows the here proposed calculator to be actually independent from the film, and just the experimental determination of the dose-blackening curve for each new considerated film is required.

Besides, as it has been already pointed out, the use of proposed theoretical model for the determination of dose highly increases the reliability of results.

As an example of calculator for the exposure time determination in gammagraphy problems according to the invention, a particular form of the calculator is illustrated. It refers to a shield constitued by concrete, having average density 2.30 gr/cm³ followed by a lead filter 0.2 cm thick. Two radiation sources are considered, namely $Co^{60}$ and $Ir^{192}$. The film is a Kodax Definix with two enforcing lead screens 0.2 mm thick.

As shown in FIGS. 6 and 7, the scales representing the variables $I$, $T$, $L$, $K$ and $R$ are arranged on the previously described circular calculator as follows: on the interior or upper disk, the scales representing source intensity $I$ and exposure time $T$ are arranged in opposite directions on the inner circumference; on the middle or intermediate disk, the scales representing the source-target (film) distance $K$ and shield (concrete) thickness $L$ are also arranged in opposite directions on the outer circumference of this disk; on the exterior or basic disk, the scale representing the radiation dose $R$ in Roentgen units is arranged adjacent the outer circumference of the intermediate disk. The source intensity ($I$) and thickness ($L$) scales are arranged in a clockwise direction; the exposure time ($T$), source-target distance ($K$) and radiation dose ($R$) scales are arranged in a counter-clockwise direction. Also disposed on the basic disk is a scale representing film blackening arranged in a counter-clockwise direction on the exterior circumference of this disk. An arrow on the basic disk indicates the actual origin of the dose scale. In a particular realization, the exterior diameter of the calculator was 14 cm.

The following selected example illustrates the manner in which the calculator, as described with reference to FIG. 6 is intended to operate.

To find the exposure time required to produce a film blackening 1.5 with a $Co^{60}$ source of 100 Curie intensity, a concrete shield of 50 cm thickness, a source-film distance of 90 cm:

a. point source-film distance (90 cm) against the reference arrow, b. point source intensity (100 Curie) against concrete thickness (50 cm)

c. read exposure time against blackening (1.5)

A value of 3.25 hours will be found for the exposure time.

As a conclusion we can summarize the major characteristics of the invention:

a. the invention covers whatever type of radiation problems (radio and gamma-protection, radiography and gammagraphy) to which the described geometrical configuration and the formula (1) or (1) and (2) apply;

b. the invention includes the theoretical evaluation of $F(L)$ based on formula (3), showing the advantages of high reliability of results and great flexibility in treating different types of radiation sources;

c. the invention includes an automatic procedure to obtain the actual drawings of the calculator to be constructed starting from known dose build-up factors and given problem specifications;

d. the proposed calculator shows high sensibility characteristics and it is accompanied with limited overall dimensions, whenever one source, one shield material, one target response, are concerned. It will be understood that enlarging the dimensions of the calculator or reducing the sensibility, it is possible to provide scales for many sources, materials, target response.

The herein presented details of various preferred embodiments are given by way of illustration only and are not intended to be limitative of the modes of realization of the invention as herein disclosed and defined, said modes of realization being intended to apply to all modifications, substitutions, equivalents or any other expedients which are either obvious or well within the purview of one skilled in the art.

We claim:

1. A circular calculator for the solution of radiation penetration problems, the parameters of which are: source intensity $I$, exposure time $T$, thickness $L$ of a shield, source-target distance $K$ and one of the radiation dose $R$ at the target position and a quantity related to the radiation effect $X$ on the target; said calculator comprising: a basic, an intermediate and an upper disk of correspondingly decreasing diameters and rotatably mounted one over the other; the basic disk bearing, along a circumferential line fixed by the circumference of the intermediate disk and starting from a predetermined zero point, a first logarithmic scale displaying the radiation dose $R$, beginning from $10^{-6}$ and ending at $10^6$ Roentgen, and bearing, along its periphery, a logarithmic blackening scale; the intermediate disk bearing along said circumference in a reverse sense with respect to said first logarithmic scale, a second logarithmic scale and a linear scale running in the opposite direction from said second logarithmic scale, said linear scale displaying, in a first direction, the thickness $L$ of the shield starting from maximum thickness until zero thickness, said second logarithmic scale displaying the source-target distance $K$ in a second direction, beginning from $10^3$ and ending at $10^1$ cm; and the upper disk bearing, along a circumferential line, third and fourth logarithmic scales running in opposite directions, said third scale displaying, in said first direction, the exposure time $T$, starting from $10^{-1}$ and ending at $10^4$ hours, said fourth scale displaying, in said second direction, the source intensity $I$, starting from $10^{-1}$ and ending at $10^5$ Curie.

2. A circular calculator for the solution of radiation penetration problems, the parameters of which are: source intensity $I$, exposure time $T$, thickness $L$ of a shield, source-target distance $K$ and one of the radiation dose $R$ at a target position and a quantity related to the radiation effect $X$ on the target, according to the equations $R(T, K, L) = I \cdot T \cdot K^{-2} \cdot F(L)$ and $$F(L) = \int_0^\infty Y(E) \cdot B(E, L) \cdot e^{-\mu(E) \cdot L} \cdot e^{-\Sigma j \mu j(E) \cdot Sj} \, dE$$

where:
$E$ = energy
$y(E)$ = radiation yield for actual radiation source
$\mu(E)$ = absorption coefficient
$f$ = normalization factor
$B(E,L)$ = dose build-up factor for actual configuration
$j$ = filters index
$s$ = filter thickness said calculator comprising: a basic, an intermediate and an upper disk of correspondingly decreasing diameters and rotatably mounted one over the other; the basic disk bearing, along a line determined by the circumference of the intermediate disk and starting from a predetermined zero point, a first logarithmic scale displaying the radiation dose $R$, said basic disk bearing, along its periphery, a logarithmic blackening scale; the intermediate disk bearing along said circumference in a reverse sense with respect to said first logarithmic scale, a second logarithmic scale and a linear scale running in the opposite direction from said second logarithmic scale, said linear scale displaying the thickness $L$ and said second logarithmic scale displaying the source-target distance $K$; and the upper disk bearing, along a circumferential line thereof, third and fourth logarithmic scales running in opposite directions, said third scale displaying the exposure time $T$ and said fourth scale displaying the source intensity $I$.

3. A circular calculator for the solution of radiation penetration problems, the parameters of which are: source intensity $I$, exposure time $T$, thickness $L$ of a shield, source-target distance $K$ and one of the radiation dose $R$ at a target position and a quantity related to the radiation effect $X$ on the target; said calculator comprising: a basic, an intermediate and an upper disk of correspondingly decreasing diameters and rotatably mounted one over the other; the basic disk bearing, along a line determined by the circumference of the intermediate disk and starting from a predetermined zero point, a first logarithmic scale displaying the radiation dose $R$, said basic disk bearing, along its periphery, a logarithmic blackening scale; the intermediate disk bearing along said circumference in a reverse sense with respect to said first logarithmic scale, a second logarithmic scale and a linear scale running in the opposite direction from said second logarithmic scale, said linear scale displaying the thickness $L$ and said second logarithmic scale displaying the source-target distance $K$ and the upper disk bearing, along a circumferential line thereof, third and fourth logarithmic scales running in opposite directions, said third scale displaying the exposure time $T$ and said fourth scale displaying the source intensity $I$.

* * * * *